E. RAMSDELL.
TIRE CASING INSPECTING APPARATUS.
APPLICATION FILED OCT. 21, 1918. RENEWED JULY 4, 1919.

1,376,579.

Patented May 3, 1921.

Inventor.
Earle Ramsdell
By Brackett and Hyde
Attys.

UNITED STATES PATENT OFFICE.

EARLE RAMSDELL, OF CLEVELAND, OHIO.

TIRE-CASING-INSPECTING APPARATUS.

1,376,579.  Specification of Letters Patent.  Patented May 3, 1921.

Application filed October 21, 1918, Serial No. 258,950. Renewed July 4, 1919. Serial No. 308,685.

*To all whom it may concern:*

Be it known that I, EARLE RAMSDELL, citizen of the United States, residing at Cleveland, in the county of Cuyahoga and State of Ohio, have invented certain new and useful Improvements in Tire-Casing-Inspecting Apparatus, of which the following is a specification.

This invention relates to apparatus for use in manipulating tire casings for the inspection thereof.

In shops where tires are manufactured and in others where they are repaired it is essential inspection be made to determine where any breaks or imperfections occur and by reason of the closeness of the beads such inspection is very difficult. Furthermore it is almost impossible to inspect a casing without some means for supporting it so that the inspector may view the inside. With the present apparatus the inspector may separate the beads by blocks or other separators arranged at intervals around the casing and may support the casing during this operation and also during the inspection by placing the casing upon an apparatus which is arranged to support it at a slight incline to the vertical and at the same time permit it to be rotated or rolled around whereby the inspector may see all parts of the inside of the casing. To facilitate inspection in various places a light is placed on the support at a convenient point so that the inside of the casing is illuminated.

The invention may be further briefly summarized as consisting in the construction and combination of parts hereinafter set forth in the following drawings, description and claims.

Figure 1:
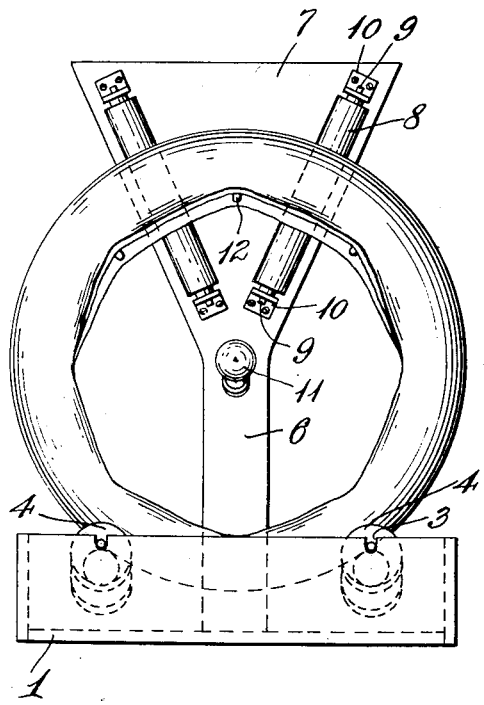
Figure 2:
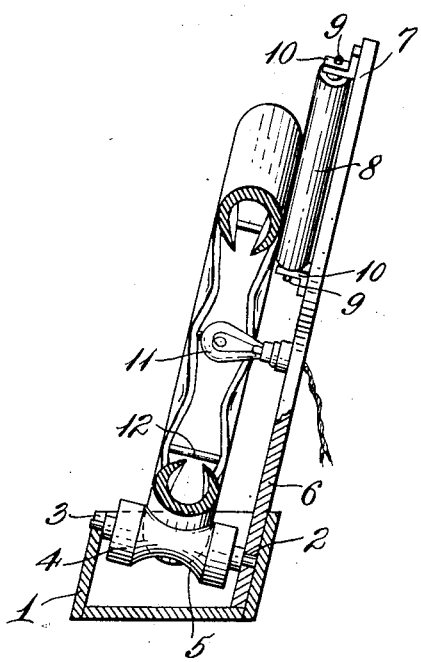

Referring to the drawings, Figure 1 is a front elevation of the device; and Fig. 2 is a side view partly in section and partly in elevation showing the parts and their arrangement.

Referring to the drawings 1 represents the base which is shown in the form of a box or trough. Extending transversely of this trough and supported in openings 2 in the rear and in slots 3 in the front, in an inclined position, are rollers 4 having rounded recesses 5 adapted to receive the tread of the casing. Extending up from the rear of this box or trough is a support 6 having a triangular portion 7 upon the front face of which are suitable diagonally extending rollers 8 having trunnions 9 arranged in suitable bearings 10 secured to the triangular portion 7. The rollers 8 are arranged so that they will accommodate casings of various sizes.

Secured to the support at a point which will lie within the inner periphery of all casings is a suitable lamp 11 or other illuminating device.

In use the inspector places the casing in the recess 5 of the rollers 4 and swings it back until it rests against the rollers 8. He then separates the bead by hand and inspects the inner walls of the casing or he places bars 12 between the beads at intervals around the casing so that he may roll it around in the device and inspect the inner wall of the casing.

Having described my invention I claim:—

1. Apparatus for inspecting tire casings, comprising a base, grooved spaced rollers mounted in the base, an upright supported by and inclined to the base, and spaced rollers mounted on the up-right, said rollers carried by the up-right being sufficient in length to accommodate various sizes of casings and being inclined to each other and conforming substantially to the mean radius of the various casings to be inspected.

2. Apparatus for tire casing inspection, comprising a base, an up-right support, a pair of spaced rollers mounted in the base, other rollers mounted in the support for holding the casing substantially up-right on the rollers in the base, and an illuminating device carried by the up-right and arranged in a position such that it is within all of the casings to be inspected.

3. Apparatus for inspecting tire casings, comprising a base, spaced rollers mounted in the base and upon which the tire casing to be inspected is adapted to rest, and a roller carried by said base with its axis lying in a plane inclined to the vertical and at one side of the plane of the tire casing to be inspected and against which the side of said tire casing is adapted to rest, thereby supporting the tire casing in an inclined position and enabling it to be freely rotated on said rollers.

4. Apparatus for inspecting tire casings, comprising a support, a plurality of rollers carried by said support and arranged to support a tire casing to be inspected in a substantially vertical position to enable it to be freely rotated about its own axis, and illuminating means carried by the support and located at substantially the center of the tire casing carried by said support and adapted to illuminate the inside of said casing.

In testimony whereof I affix my signature.

EARLE RAMSDELL.